(12) United States Patent
Qiu et al.

(10) Patent No.: US 7,706,768 B2
(45) Date of Patent: Apr. 27, 2010

(54) DIVERSITY SWITCHING

(75) Inventors: Sigang Qiu, Sunnyvale, CA (US);
Sathish K. Kumar, Santa Clara, CA (US); Atul A. Salvekar, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 712 days.

(21) Appl. No.: 11/461,865

(22) Filed: Aug. 2, 2006

(65) Prior Publication Data

US 2008/0032654 A1 Feb. 7, 2008

(51) Int. Cl.
*H04B 7/00* (2006.01)

(52) U.S. Cl. .................. 455/277.1; 455/275; 455/13.3; 343/876; 343/751

(58) Field of Classification Search .......... 455/424, 455/425, 456.5, 561, 550.1, 575.1, 13.3, 455/63.4, 83, 575.7, 562.1, 107, 121, 129, 455/269, 275, 134, 277.1, 193.1; 343/757, 343/725, 702, 853, 893; 375/347, 346; 270/345, 270/347; 342/434, 442, 445
See application file for complete search history.

(56) References Cited

U.S. PATENT DOCUMENTS

| | | | |
|---|---|---|---|
| 4,953,197 A * | 8/1990 | Kaewell et al. .......... 455/562.1 |
| 5,235,621 A * | 8/1993 | Amir-Alikhani ............ 375/347 |
| 5,239,541 A * | 8/1993 | Murai ........................ 370/345 |
| 5,280,637 A * | 1/1994 | Larosa et al. ............... 455/134 |
| 5,303,240 A * | 4/1994 | Borras et al. ................. 370/347 |
| 5,319,555 A * | 6/1994 | Iwaki et al. .................... 701/57 |
| 5,321,850 A * | 6/1994 | Backstrom et al. .......... 455/139 |
| 5,392,300 A * | 2/1995 | Borth et al. ................. 714/758 |
| 5,561,673 A * | 10/1996 | Takai et al. ................. 714/708 |
| 6,032,033 A * | 2/2000 | Morris et al. ............. 455/277.2 |
| 7,369,823 B2 * | 5/2008 | Oiwa ........................... 455/135 |
| 2002/0113743 A1 * | 8/2002 | Judd et al. ................... 343/757 |
| 2002/0160737 A1 | 10/2002 | Crawford |
| 2003/0002471 A1 * | 1/2003 | Crawford et al. ............ 370/343 |
| 2003/0060178 A1 | 3/2003 | Ghassemzadeh et al. |
| 2004/0229650 A1 * | 11/2004 | Fitton et al. ................. 455/561 |
| 2005/0059431 A1 * | 3/2005 | Matsui et al. ............. 455/562.1 |
| 2005/0215214 A1 * | 9/2005 | Moorti et al. ............. 455/193.1 |
| 2006/0008037 A1 * | 1/2006 | Chang et al. ................ 375/346 |
| 2007/0173277 A1 * | 7/2007 | Yun ........................... 455/522 |

OTHER PUBLICATIONS

International Search Report, Aug. 21, 2007.
Written Opinion, Aug. 21, 2007.
Tsouri et al., "Enhancing switched diversity systems", 2004 IEEE Sensor Array and Multichannel Signal Processing Workshop, Jul. 18-21, 2004, pp. 485-488.

* cited by examiner

*Primary Examiner*—Duc Nguyen
*Assistant Examiner*—Charles Chow
(74) *Attorney, Agent, or Firm*—Schwabe, Williamson & Wyatt, P.C.

(57) ABSTRACT

A method for switched diversity, including: determining, on a pair-wise basis, a plurality of comparative quality factors corresponding to at least two antennas based on signals received by the at least two antennas; filtering, over a period of time, multiple instances of at least one of the plurality of comparative quality factors; and selecting at least one of the signals to couple to at least one receiver chain based on the comparative quality factors.

19 Claims, 10 Drawing Sheets

DIVERSITY SWITCHING

BACKGROUND OF THE INVENTION

Diversity reception schemes may be used to improve the quality of wireless communications. While there are various types of diversity reception schemes known, one of them involves the use of multiple antennas. While multiple antennas may be used in various ways, a particular way in which they may be used is in a switching scheme, in which the output of a particular receive antenna may be routed to a particular receiver chain. This type of scheme may be referred to as switched diversity.

In some switched diversity schemes, which antenna output is routed to a receiver chain may be determined based on a signal-to-noise ratio (SNR) determined for each antenna. However, SNR determination may be computationally intensive, and SNR approximations may be inaccurate and may thus lead to less than reliable results.

In other switched diversity schemes, a received signal strength indicator (RSSI) may be used for determining which antenna output is routed to a receiver chain. While RSSI determination may be less computationally intensive than SNR determination, switching based on RSSI, only, may also be less than reliable.

BRIEF DESCRIPTION OF THE DRAWINGS

Various embodiments of the invention may be better understood by reading the following detailed description with reference to the accompanying figures, in which like reference numerals refer to like elements throughout, and in which.

DETAILED DESCRIPTION OF VARIOUS EMBODIMENTS

Figure 1:
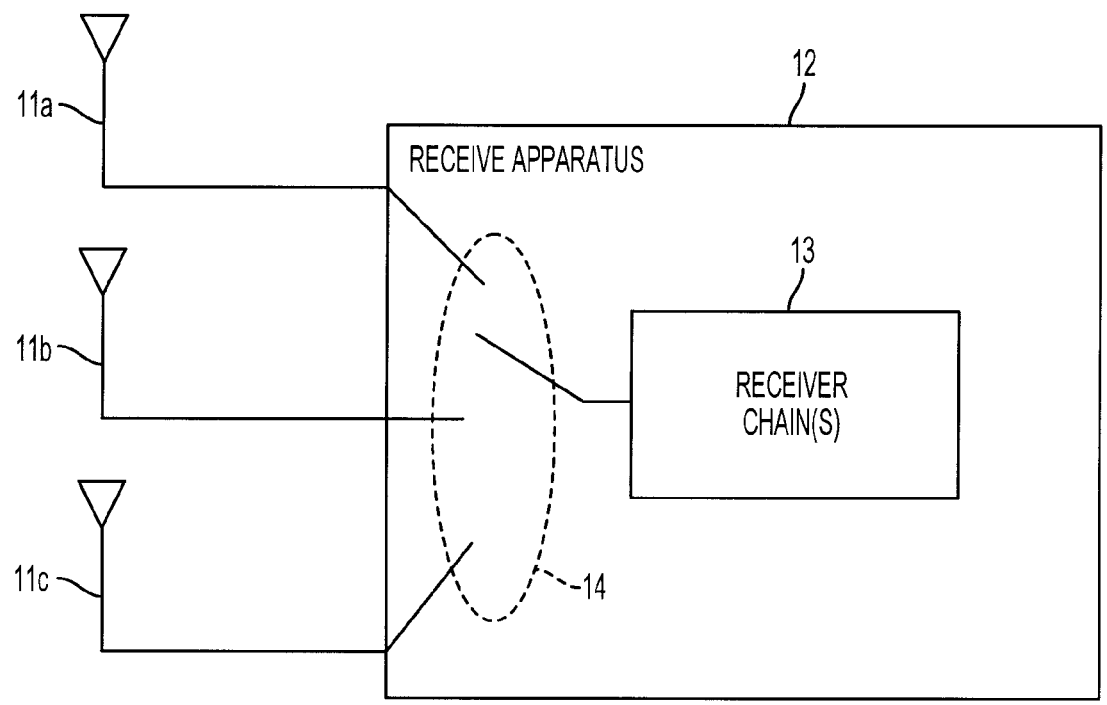
FIG. 1 is a conceptual block diagram of a system in which various embodiments of the invention may be used.

In the following description, numerous specific details are set forth. However, it is understood that embodiments of the invention may be practiced without these specific details. In other instances, well-known circuits, structures, and/or techniques have not been shown in detail in order not to obscure an understanding of this description.

References to "one embodiment", "an embodiment", "example embodiment", "various embodiments", etc., indicate that the embodiment(s) of the invention so described may include a particular feature, structure, or characteristic, but not every embodiment necessarily includes the particular feature, structure, or characteristic. Further, repeated use of the phrase "in one embodiment" or "in an embodiment" does not necessarily refer to the same embodiment, although it may.

In the following description and claims, the term "coupled," along with its derivatives, may be used. It should be understood that "coupled" may mean that two or more elements are in direct physical or electrical contact with each other or that the two or more elements are not in direct contact but still cooperate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments of the present invention may include apparatuses for performing the operations herein. An apparatus may be specially constructed for the desired purposes, or it may comprise a general purpose device selectively activated or reconfigured by a program stored in the device.

Embodiments of the invention may be implemented in one or a combination of hardware, firmware, and software. Embodiments of the invention may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include machine-readable storage media, such as read only memory (ROM), random access memory (RAM), magnetic disk storage media, optical storage media, flash memory devices, and others. A machine-readable storage medium may be located locally or remotely, with respect to other portions of embodiments of the invention (for example, but not limited to, a machine-readable medium accessed by means of a communication network).

FIG. 1 shows a switched diversity system that may be used in some embodiments of the invention. FIG. 1 includes three antennas, 11a, 11b, and 11c; however, there may be as few as two or more than three in some embodiments of the invention. Each of antennas 11a-11c may be any antenna appropriate for receiving the signals to be received and may include, but are not limited to, directive antennas, phased arrays, monopoles, dipoles, etc. Antennas 11a-11c may be coupled to receive apparatus 12. Receive apparatus 12 is shown as a single block in FIG. 1, but it is not thus limited; on the contrary, receive apparatus 12 may include multiple components, some of which may be duplicative of one another. Receive apparatus 12 includes at least one receiver chain 13 (one is shown, but more may be present). Receiver chain 13 may include apparatus to process signals received from one or more of antennas 11a-11c. In a switched diversity system, each receiver chain 13 may be coupled to the outputs of the various antennas by means of a switching mechanism 14. As shown in FIG. 1, switching mechanism 14 permits the coupling of an output from each of antennas 11a-11c to receiver chain 13; however, the invention is not to be understood as being thus limited, and switching mechanism 14 may generally permit coupling of a given receiver chain 13 to only a subset of the outputs of antennas 11a-11c.

A switched diversity scheme may work in several ways, which may, for example, depend upon the type and/or quantity of processing facilities. As noted above, in a switched diversity scheme, some quantity indicative of the quality of a signal being received by an antenna 11a-11c may be determined and used to determine which antenna to couple to a receiver chain 13. The determination of signal quality may be performed by appropriate apparatus associated with each antenna, or the signals from the various antennas may be switched among one or more such apparatuses. Furthermore, the determination of signal quality may be based on analog and/or digital methods.

Figure 2:
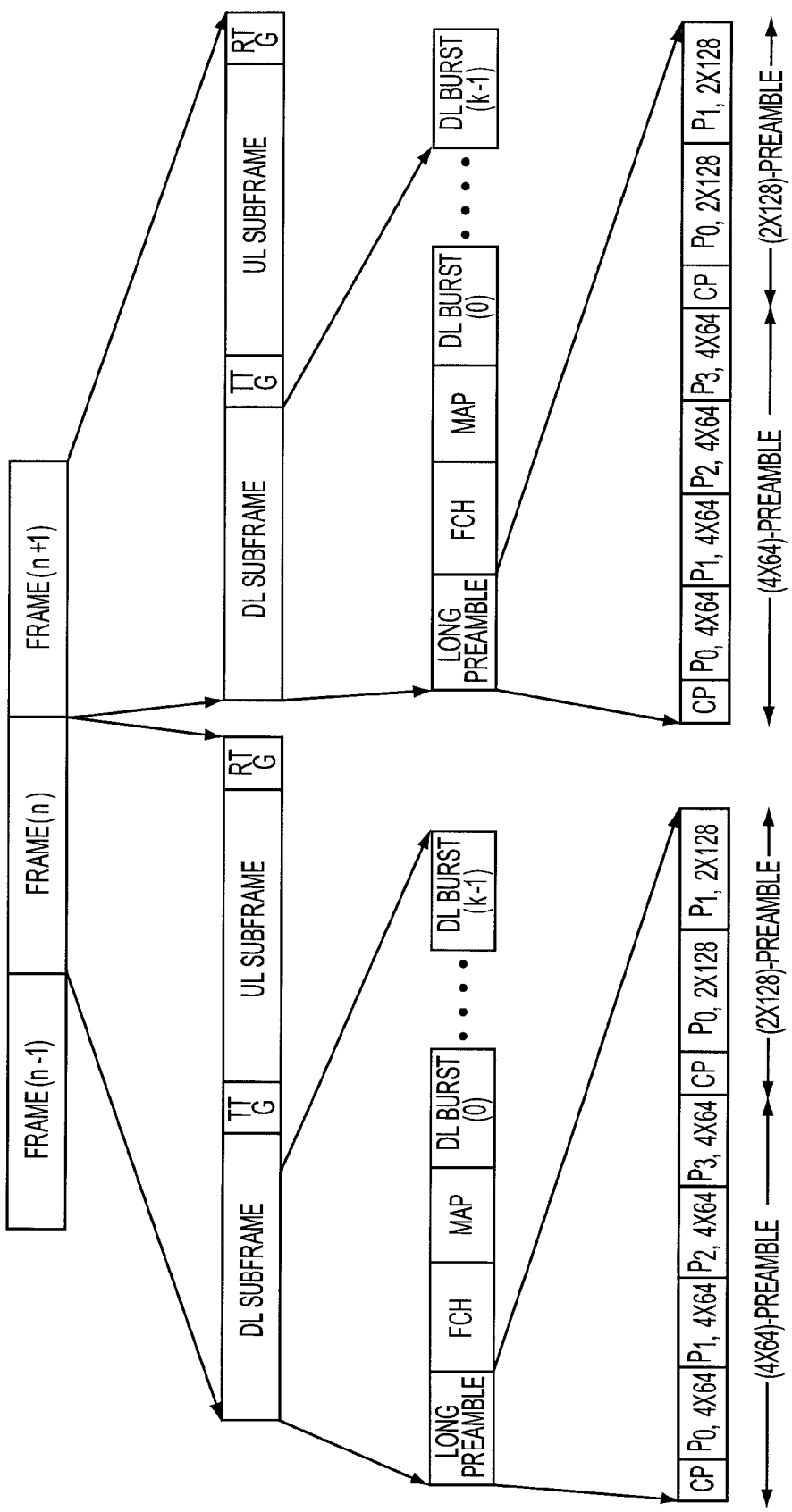
FIG. 2 shows a conceptual diagram of a preamble structure that may be used in various embodiments of the invention.

In many communication systems, a preamble may be included as a first portion of a transmission. Such a preamble may be used to determine signal quality for purposes of diversity switching, prior to processing data content of a transmitted signal. FIG. 2 shows an exemplary preamble format and how it may fit into an overall signaling format. In particular, a frame may include downlink (DL) and uplink (UL) subframes. The DL subframe may include, among other portions, a "Long Preamble;" an example of where this structure may be found is in some of the standards for use in short-range wireless signaling. As shown, the Long Preamble may, in turn, include a cyclic prefix (CP), followed by four 64-sample preamble portions, which may be followed by another CP portion and another two 128-sample preamble portions. In FIG. 2, all of these preamble portions are shown as occurring prior to the transmission of downlink data transmissions ("DL Bursts").

Figure 3:
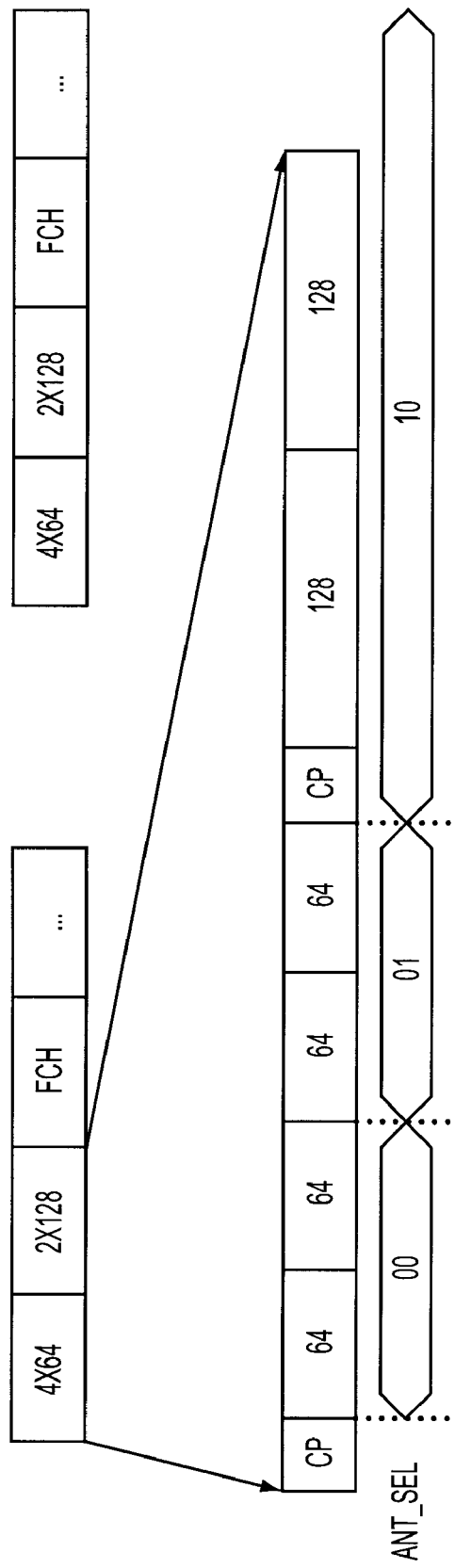
FIG. 3 shows a timing diagram of how switching criteria may be evaluated in some embodiments of the invention.

In one embodiment of the invention, as mentioned above, the receive apparatus 12 may have only a single apparatus, which may be part of or separate from receiver chain 13, for evaluating signal quality from the antennas 11a-11c. In that case, the single apparatus may be shared among all of the antennas 11a-11c. FIG. 3 shows one way in which this may be done, according to some embodiments of the invention. In a first interval, denoted "00", the output of a first antenna may be evaluated, based on a first portion of the preamble. In some embodiments, to which the invention is not limited, this first portion may comprise the first two 64-sample preamble portions as shown in FIG. 2. Similarly, a second antenna, denoted "01", may be evaluated using a second portion of the preamble, which may correspond to the second two 64-sample preamble portions as shown in FIG. 2; however, the invention is not thus limited. A third antenna, if present, may, for example, be evaluated using the portion denoted "10" in FIG. 3, which may correspond to one or more of the 128-sample portions of the preamble structure as shown in FIG. 2, but to which the invention is not limited.

One way to determine an antenna to use would be to compute a signal-to-noise ratio (SNR) for each antenna and to compare the SNRs for the different antennas. In general, SNR may be represented as:

$$SNR_k = \frac{|X_k|}{E_k - |X_k|},$$

where "X" represents signal energy, while "E" represents the total received energy (signal plus noise). The subscript "k" is used to denote the $k^{th}$ antenna. For the exemplary case discussed above, in which there is a single apparatus for determining the signal quality for all of the antennas, the various quantities may be computed, in general, as follows:

$$E_1 = \left(\sum_{k=x}^{x+y-1} |r_k|^2 + \sum_{k=64+x}^{64+x+y-1} |r_k|^2\right),$$

$$E_2 = \left(\sum_{k=128+x}^{128+x+y-1} |r_k|^2 + \sum_{k=192+x}^{192+x+y-1} |r_k|^2\right) \text{ and}$$

$$X_1 = \left(\sum_{k=x}^{x+y-1} r_k r_{k+64}^*\right), \quad X_2 = \left(\sum_{k=128+x}^{128+x+y-1} r_k r_{k+64}^*\right),$$

where $\{r_k\}_{k=0}^{256-1}$ represents the data of the four 64-sample exemplary preamble portions shown in FIGS. 2 and 3. Given this, a block of y-samples may be represented $\{r_k\}_{k=x}^{x+y-1}$ (and similarly for subsequent blocks by adding 64 to the limits each time). Here "x" is used to denote a predetermined beginning sample number, and "y" is used to denote a total block size. For example, if all of the samples of a 64-sample block were used, x may equal 0, and y may equal 64. As will be discussed below, in some embodiments, not all of the samples may be used in determining the various quantities in all cases.

It is further noted that, if there is more than one apparatus for evaluating signal quality, more than one antenna may be analyzed during a single interval. Therefore, a common block of samples may be used to evaluate the signal quality for more than one antenna.

In the case of a pair of antennas (k=1, 2), one may decide to use antenna 1 if $SNR_1 > SNR_2$ or antenna 2 if $SNR_2 > SNR_1$. Given this, and cross-multiplying from the SNR equation above (and squaring both sides), results in the following alternative formulation of the problem:

$$QF_1 = (X_{1,re}^2 + X_{1,im}^2) \cdot E_2^2, \quad QF_2 = (X_{2,re}^2 + X_{2,im}^2) \cdot E_1^2,$$

where $X_{k,re}$ is the real part of $X_k$ and $X_{k,im}$ is the real part of $X_k$ for k=1, 2. $QF_k$ may be called the "quality factor" for the $k^{th}$ antenna. The first factor of the quality factor may be thought of as the square of a received signal strength indicator, while the second factor of the quality factor may be thought of as the square of total received energy. A flowchart of the case of two antennas, corresponding to this formulation is shown in FIG. 4A, according to an exemplary embodiment of the invention.

It is noted that if there are an arbitrary number of antennas, the formulation of the problem in terms of SNRs would involve pair-wise comparisons of the SNRs of the various antennas. Similarly, as may be shown by forming the corresponding inequalities and cross-multiplying and squaring, pair-wise determination and comparisons of quality factors may be used in the alternative formulation of the problem. For example, the flowchart of FIG. 4B shows how the flowchart of FIG. 4A may be expanded to accommodate a third antenna, according to an exemplary embodiment of the invention.

Figure 4A:
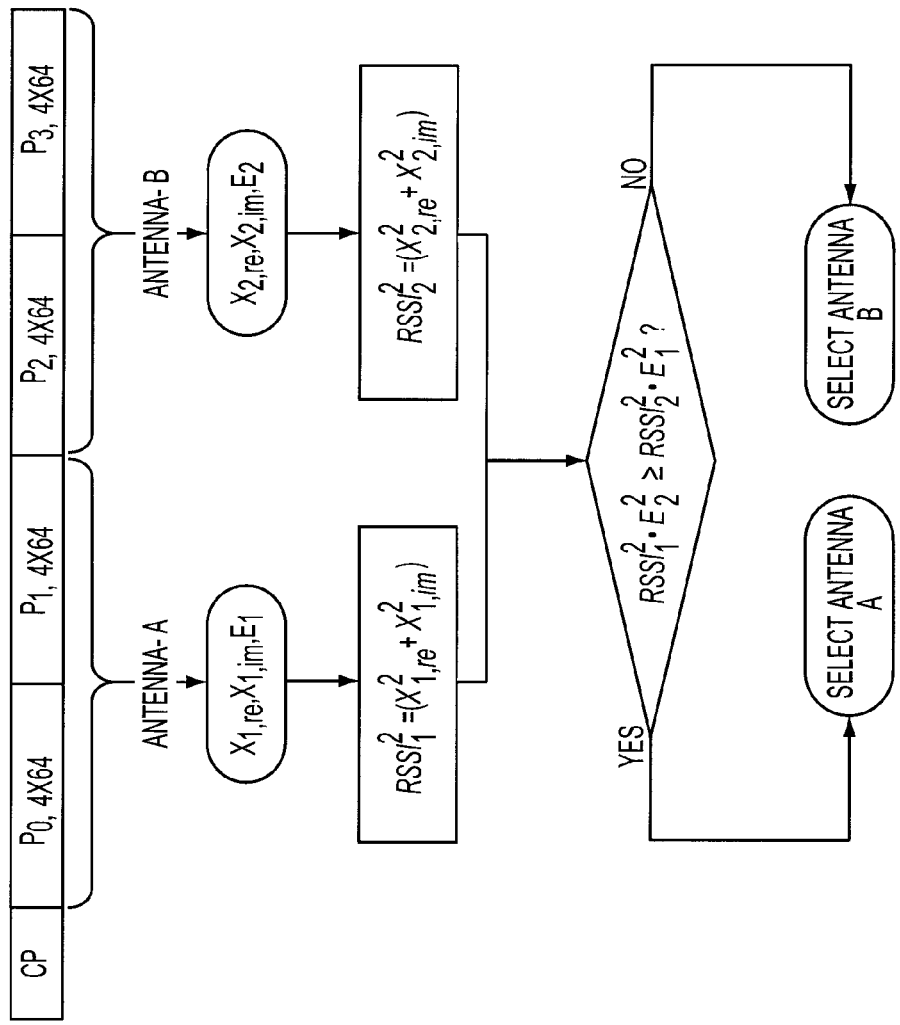
FIGS. 4A, 4B, and 4C show flowcharts of exemplary embodiments of the invention, which may be based on the preamble structures shown in FIGS. 2 and 3.
Figure 4B:
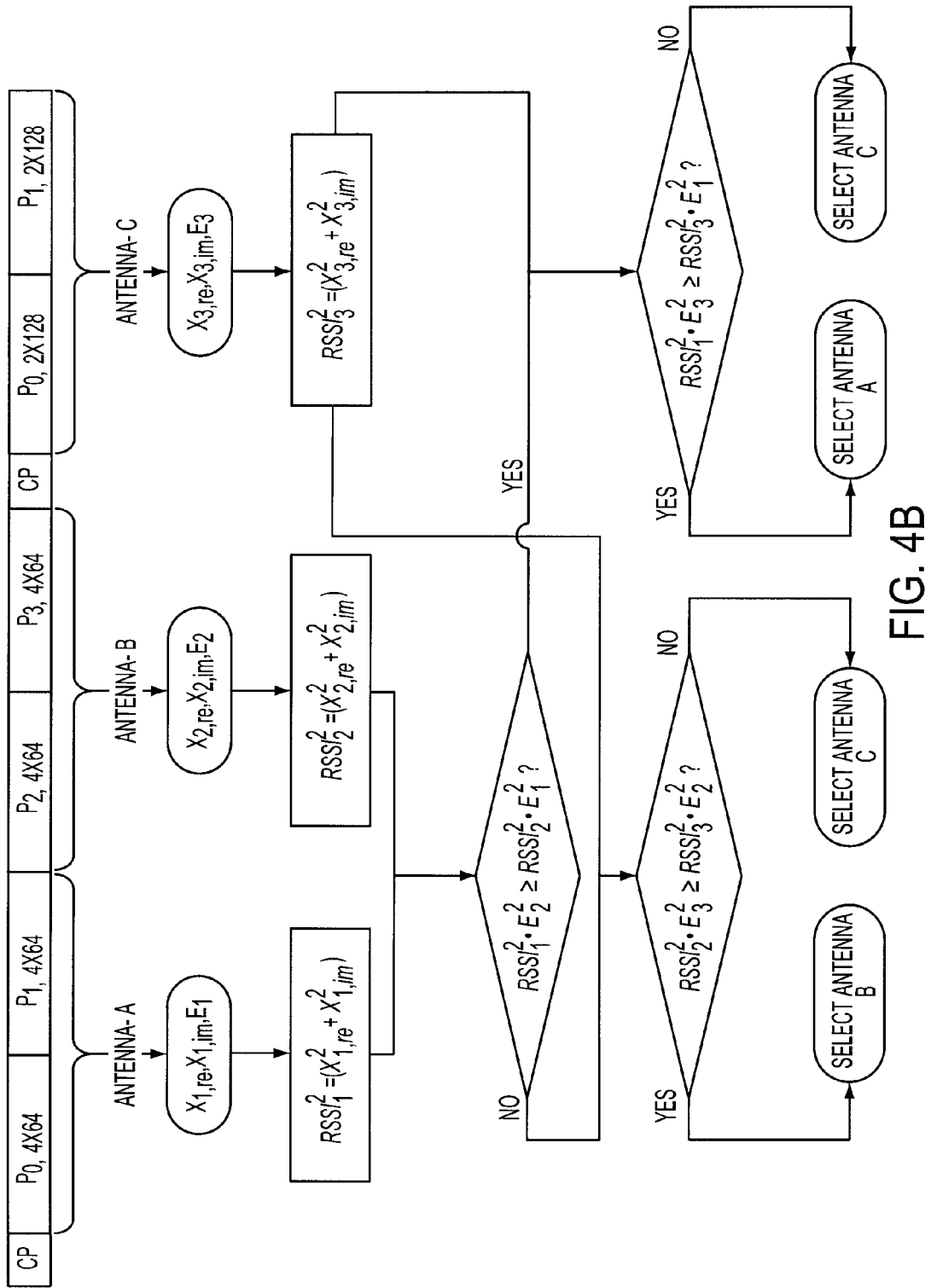
Figure 4C:
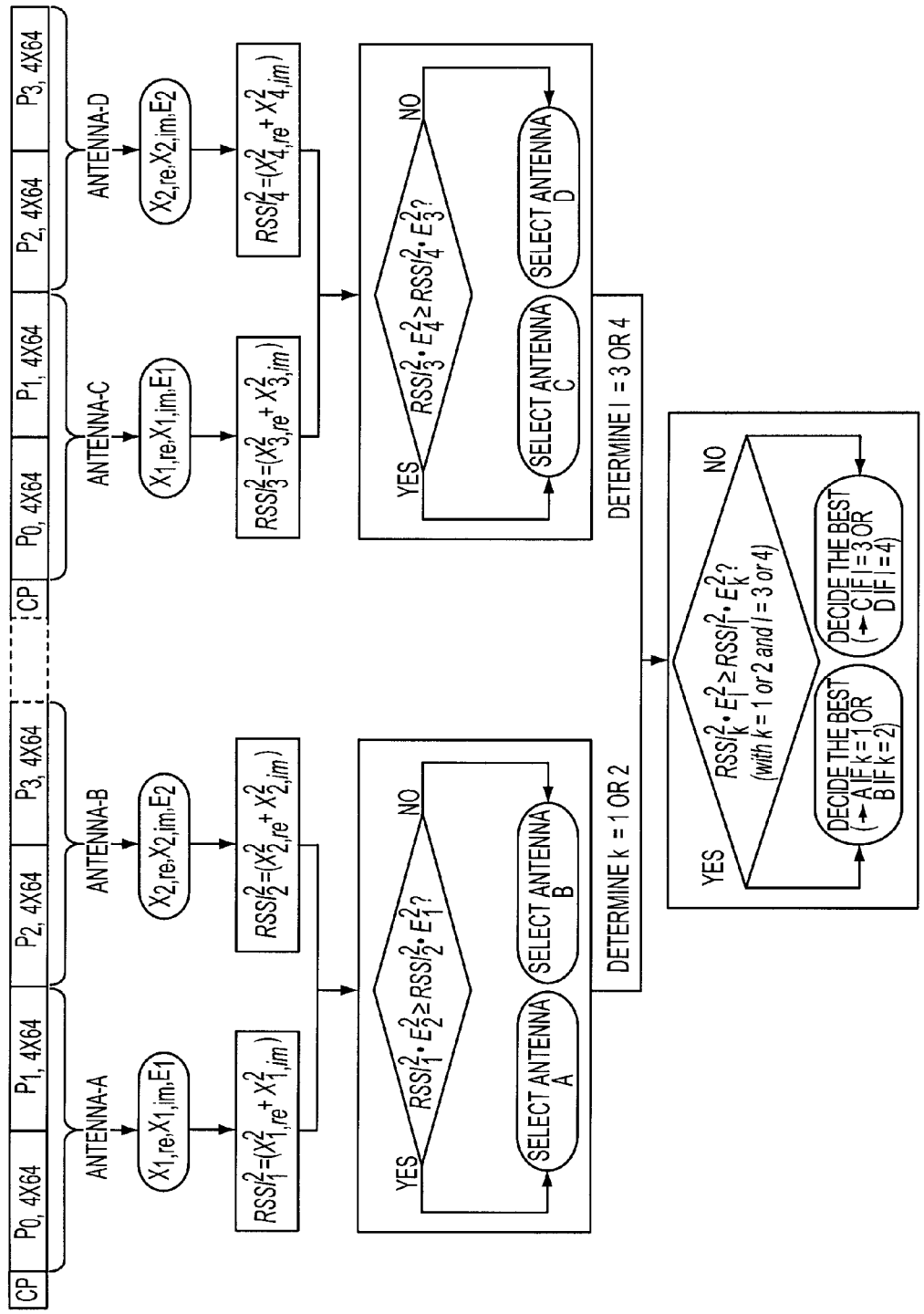

In yet a further exemplary expansion of the flowchart of FIG. 4A, FIG. 4C shows an exemplary embodiment in which four antennas may be compared. In the example of FIG. 4C, two preambles may be used to accommodate the four antennas, as shown (again, this may correspond to the case in which there is only a single module capable of computing the various quantities at a given time, and which, therefore, may be switched among the four antennas; if there are multiple modules, it may be possible to compute the quantities for multiple antennas at the same time). As shown in FIG. 4C, there may be two layers of comparisons. A first layer may be used to compare two pairs of antennas, and the second layer may be used to compare the two antennas found to have the better qualities in the first layer of comparisons.

Figure 5:
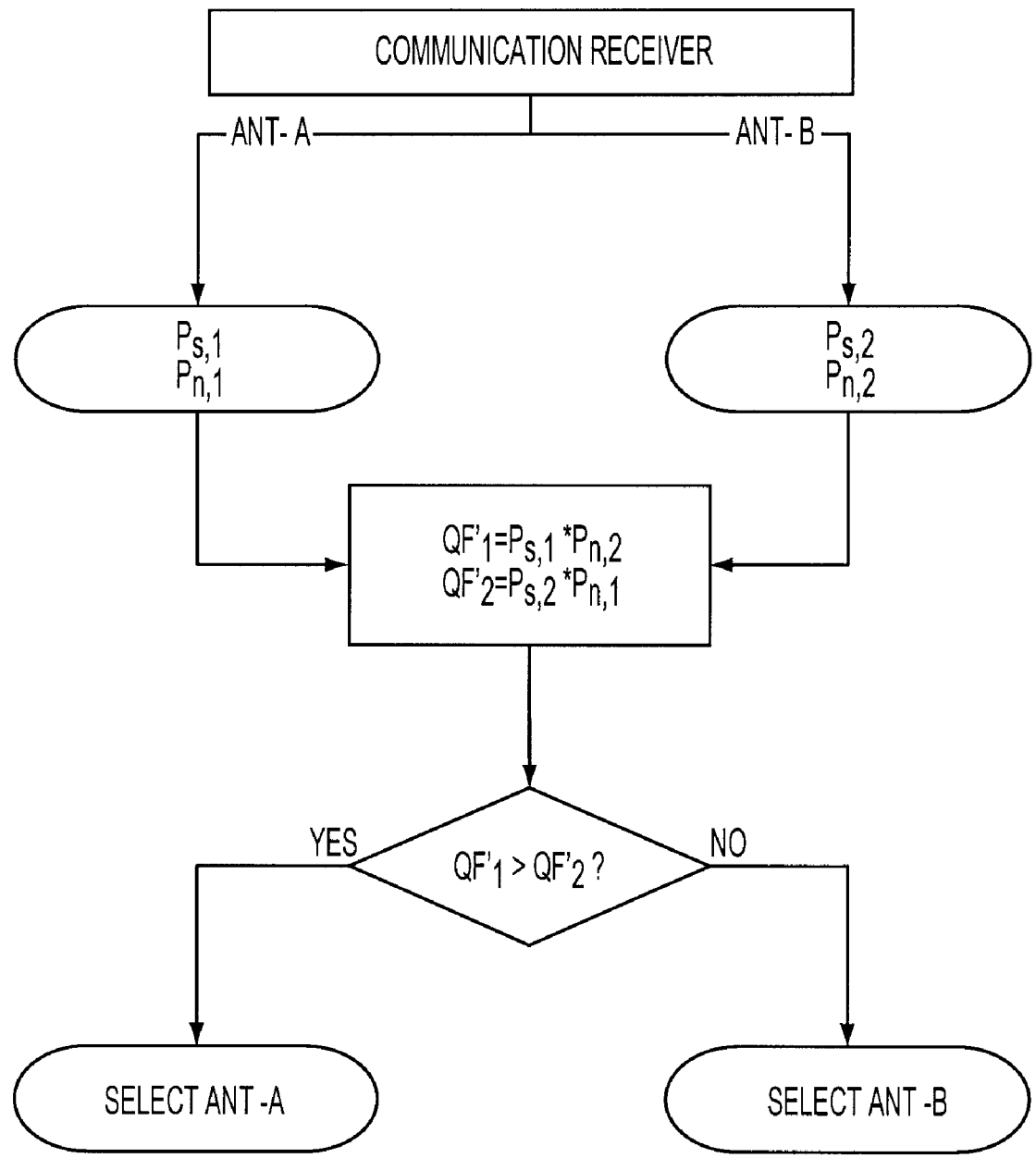
FIG. 5 shows a flowchart of a further exemplary embodiment of the invention.

It is noted that the above development may be further generalized. The $QF_k$ developed above is one example of what will be termed here a "comparative quality factor" (CQF). In general, a CQF may be defined as any quantity, based on signals received at two antennas, on which the relative signal qualities at those two antennas may be based. For example, SNR may be formulated in terms of signal power ($P_s$) and noise power ($P_n$) (i.e., as $$SNR_k = \frac{P_{s,k}}{P_{n,k}},$$

where the subscript k is used to denote the $k^{th}$ antenna. Using this formulation, another CQF may be computed as $P_{s,i} \cdot P_{n,j}$ for use in comparing the signals received by the $i^{th}$ and $j^{th}$ antennas (in other words, $P_{s,i} \cdot P_{n,j}$ may be compared to $P_{s,j} \cdot P_{n,i}$ to determine which signal has the better quality). This formulation of the CQF is reflected in the flowchart shown in FIG. 5 (it is noted that the CQFs used in FIG. 5 are denoted "$QF'_1$" and "$QF'_2$" to differentiate them from the QFs of the previous figures). This formulation may, in turn, be generalized to be based on any equivalent measurements (or derivatives of such measurements, for example, but not limited to, the square of the above SNR formulation, i.e., using the signal power squared and the noise power squared), which may be (or be based on) either analog measurements or digital measurements, and which may be based on discrete-time signals or continuous-time signals (or as combinations of any of these types of measurements and signals). That is, while the QF given above may be determined based on signal samples, the invention is not to be understood as being thus limited. Furthermore, while the discussion below focuses on the case of the QF, the discussion below may also be generalized in the fashion discussed above to apply to the CQF.

Figure 6:
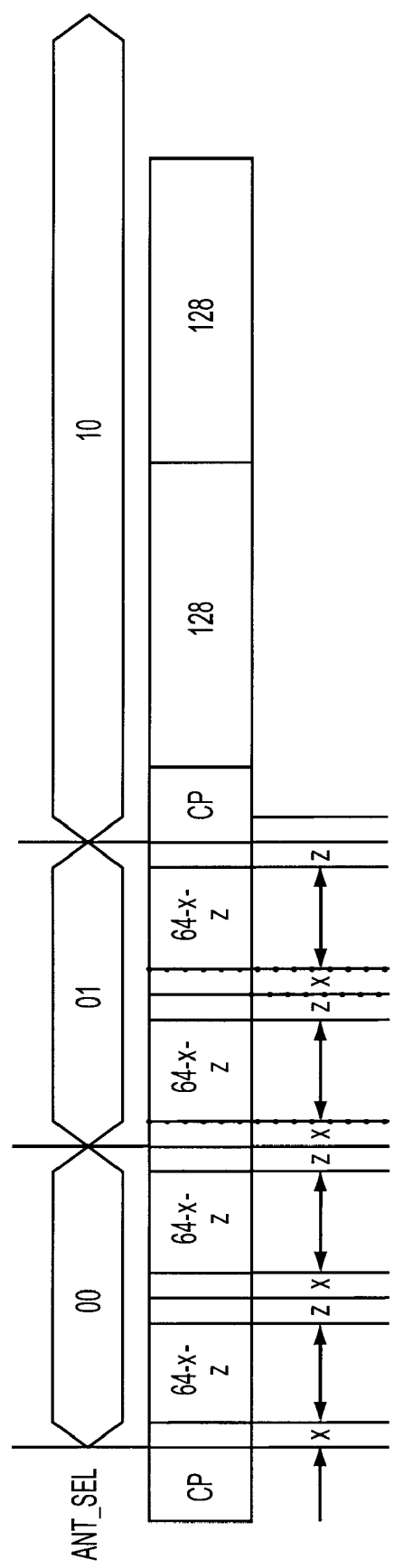
FIG. 6 shows how switching criteria may be evaluated according to some embodiments of the invention.

When apparatus is switched between or among antennas, physical switches may cause latency (delay) and/or ripple effects. To avoid these, which may improve the accuracy of the calculations above, a few samples may be skipped at the beginning and/or at the end of each portion of the preamble. FIG. 6 shows a conceptual diagram of this, based on the embodiment of FIG. 3. In FIG. 6, a number of samples, "x", may be excluded to account for switching ripple effects, while a number of samples, "z", may be excluded to account for switching latency. In this embodiment, the quantities discussed above may still be determined using the equations above, but now x may be non-zero, and, for the example of 64-sample preamble portions, y may equal 64−z. For example, if a first 64-sample interval were to be considered, starting with the first ($0^{th}$) sample, the upper and lower limits of the first summation to determine $E_1$ may be x and x+64−z−1, respectively.

In some cases in which there may be large amounts of latency and/or ripple, the sum of x and z may be relatively large in comparison with the number of samples in a preamble portion that may be used to determine QF. For example, in the above example shown in FIG. 2, to which the invention is not to be limited, if x+z is large with respect to 64, the quantities computed may not be sufficiently meaningful (statistically significant) to accurately reflect the relative signal qualities. In such a case, one may use more samples. For example, in the case shown in FIG. 2, all four 64-sample portions, which may be divided into two 128-sample portions, may be used, along with the two 128-sample portions. In extreme cases, the first 256-sample portion (i.e., four 64-sample portions) may be used for switching, while the second 256-sample portion (i.e., two 128-sample portions) may be used for computing; in this case, for example, if there are two antennas and only one apparatus for determining QF, two different preambles may be used to compute the necessary quantities.

Figure 7:
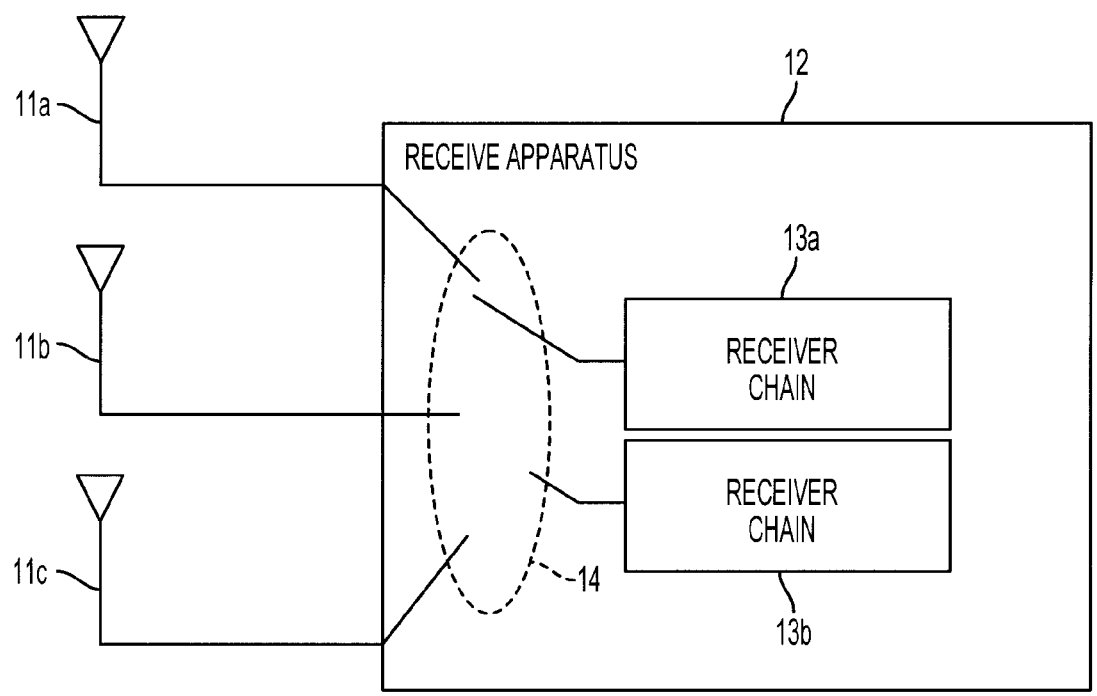
FIG. 7 shows an exemplary block diagram showing an expanded embodiment of the invention.

As noted above, various embodiments of the invention may include more than one receiver chain 13, say N receiver chains 13a-13b, as shown in the exemplary block diagram of FIG. 7. In that case, if there are M antennas 11a-11c, the above methods may be adapted in straightforward fashion to select the N out of M antennas 11a-11c having the highest quality factors, in pair-wise comparisons. That is, as above, the quality factors may be determined for each pair of antennas 11a-11c, and the antennas having the highest quality factors, relative to one another, may be selected to be connected to receiver chains 13a-13b.

In some embodiments of the invention, filtered switched diversity statistics, over a number of frames or other time intervals, may be used to determine which antenna(s) to connect to the receiver chain(s). Such filtering may be, but is not limited to, a first-order moving average filter, such as:

$$y(n) = \alpha \cdot x(n) + (1-\alpha) \cdot y(n-1),$$

where x(n) may represent the quality factor, e.g., for the $n^{th}$ frame, and where α is a filter parameter, which may be predetermined, set by the user, or set by the system designer. As noted above, other filters may be used.

Figure 8:
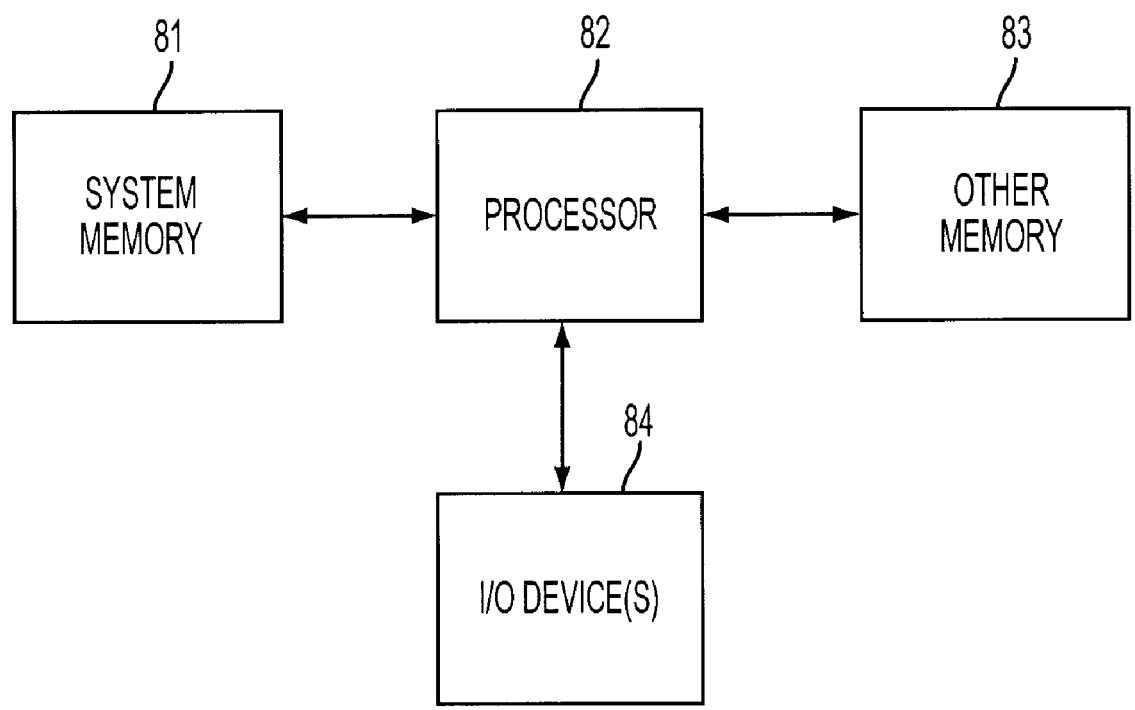
FIG. 8 shows a schematic block diagram of an apparatus that may be used in implementing various exemplary embodiments of the invention.

Some embodiments of the invention, as discussed above, may be embodied, at least in part, in the form of software instructions on a machine-accessible medium. Such an embodiment may be illustrated in FIG. 8. The computer system of FIG. 8 may include at least one processor 82, with associated system memory 81, which may store, for example, operating system software and the like. The system may further include other additional memory 83, which may, for example, include software instructions to perform various applications. System memory 81 and other memory 83 may comprise separate memory devices, a single shared memory device, or a combination of separate and shared memory devices. The system may also include one or more input/output (I/O) devices 84, for example (but not limited to), keyboard, mouse, trackball, printer, display, network connection, etc. The present invention, or parts thereof, may be embodied as software instructions that may be stored in system memory 81 or in other memory 83. Such software instructions may also be stored in removable or remote storage media (for example, but not limited to, compact disks, floppy disks, etc.), which may be read through an I/O device 84 (for example, but not limited to, a floppy disk drive). Furthermore, the software instructions may also be transmitted to the computer system via an I/O device 84, for example, a network connection; in such a case, a signal containing the software instructions may be considered to be a machine-accessible medium.

The embodiments illustrated and discussed in this specification are intended only to teach those skilled in the art the best way known to the inventors to make and use the invention. Nothing in this specification should be considered as limiting the scope of the present invention. The above-described embodiments of the invention may be modified or varied, and elements added or omitted, without departing from the invention, as appreciated by those skilled in the art in light of the above teachings. It is therefore to be understood that, within the scope of the claims and their equivalents, the invention may be practiced otherwise than as specifically described.

What is claimed is:

1. A method, comprising:
    determining, on a pair-wise basis, a plurality of comparative quality factors corresponding to at least two antennas based on signals received by said at least two antennas;
    filtering, over a period of time, multiple instances of at least one of said plurality of comparative quality factors; and
    selecting at least one of said signals to couple to at least one receiver chain based on said comparative quality factors, wherein each said comparative quality factor is determined as a squared received signal strength indicator corresponding to a signal received by one antenna of a pair multiplied by a squared energy received by the other antenna of the pair.

2. The method according to claim 1, wherein said determining comprises:
    computing said quality factors based on signals corresponding to at least one preamble portion of a received signal.

3. The method according to claim 2, wherein said computing comprises:
    computing the squared received signal strength indicator and the squared energy received corresponding to different antennas based on different preamble portions.

4. The method according to claim 2, wherein said computing comprises:
    omitting at least one portion of said signals of said at least one preamble corresponding to at least one of the time intervals selected from the group consisting of: a time interval corresponding to a switching latency time and a time interval corresponding to a switching ripple time.

5. The method according to claim 1, wherein each said comparative quality factor is computed as a product of a quantity indicative of a quality of signal content received at one antenna of a pair multiplied by a quantity indicative of noise content received at the other antenna of the pair.

6. A machine-accessible medium containing software code that, when executed by a processor, causes the processor to execute the method comprising:
    determining, on a pair-wise basis, a plurality of comparative quality factors corresponding to at least two antennas based on signals received by said at least two antennas;
    filtering, over a period of time, multiple instances at least one of said plurality of comparative quality factors; and
    selecting at least one of said signals to couple to at least one receiver chain based on said comparative quality factors, wherein each said comparative quality factor is determined as a squared received signal strength indicator corresponding to a signal received by one antenna of a pair multiplied by a squared energy received by the other antenna of the pair.

7. The machine-accessible medium according to claim 6, wherein said determining comprises:
    computing said comparative quality factors based on signals corresponding to at least one preamble portion of a received signal.

8. The machine-accessible medium according to claim 7, wherein said computing comprises:
    computing the squared received signal strength indicator and the squared energy received by different antennas based on different preamble portions.

9. The machine-accessible medium according to claim 7, wherein said computing comprises:
    omitting at least one portion of said signals of said at least one preamble corresponding to at least one of the time intervals selected from the group consisting of: a time interval corresponding to a switching latency time and a time interval corresponding to a switching ripple time.

10. The machine-accessible medium according to claim 6, wherein each said comparative quality factor is computed as a product of a quantity indicative of a quality of signal content received at one antenna of a pair multiplied by a quantity indicative of noise content received at the other antenna of the pair.

11. An apparatus, comprising:
    at least one switch to switch among outputs of at least two antennas;
    at least one receiver chain, each receiver chain to be coupled to one of said at least one switch; and
    at least one module to determine, on a pair-wise basis, comparative quality factors corresponding to said at least two antennas based on signals received by said at least two antennas, the at least one module to be coupled to said at least one switch to control the at least one switch,
    wherein at least one said module includes: at least one filter to operate on multiple instances of at least one said comparative quality factor over a period of time,
    wherein each said comparative quality factor is to be computed as a product of a quantity indicative of a quality of signal content received at one antenna of a pair multiplied by a quantity indicative of noise content received at the other antenna of the pair.

12. The apparatus according to claim 11, wherein said quantity indicative of a quality of received signal content is to be determined as a squared received signal strength indicator, and wherein said quantity indicative of noise content is to be determined as a squared energy.

13. The apparatus according to claim 11, wherein said at least one module is a part of at least one receiver chain.

14. The apparatus according to claim 11, wherein said at least one module comprises multiple modules, each to be coupled to an output of at least one antenna.

15. The apparatus according to claim 14, wherein each said module is to be coupled to an output of at least one antenna via at least one said switch.

16. A system, comprising:
    at least two antennas;
    at least one switch to switch among outputs of said at least two antennas;
    at least one receiver chain, each receiver chain to be coupled to one said switch; and
    at least one module to determine, on a pair-wise basis, comparative quality factors corresponding to said at least two antennas based on signals received by said at least two antennas, the at least one module to be coupled to said at least one switch to control the at least one switch, wherein at least one said module includes: at least one filter to operate on multiple instances of at least one said comparative quality factor over a period of time, wherein each said comparative quality factor is to be computed as a product of a quantity indicative of a quality of signal content received at one antenna of a pair multiplied by a quantity indicative of noise content received at the other antenna of the pair.

17. The system according to claim 16, wherein said quantity indicative of a quality of received signal content is to be determined as a squared received signal strength indicator, and wherein said quantity indicative of noise content is to be determined as a squared energy.

18. The system according to claim 16, wherein said at least one of said at least two antennas comprises an antenna selected from the group consisting of: a directive antenna; a monopole antenna, and a dipole antenna.

19. The system according to claim 16, wherein said at least one module comprises multiple modules, each to be coupled to an output of at least one antenna via at least one said switch.

* * * * *